March 9, 1954 H. E. HAYNES 2,671,871
SIGNAL TRANSLATING APPARATUS CORRECTION SYSTEM
Filed July 31, 1951
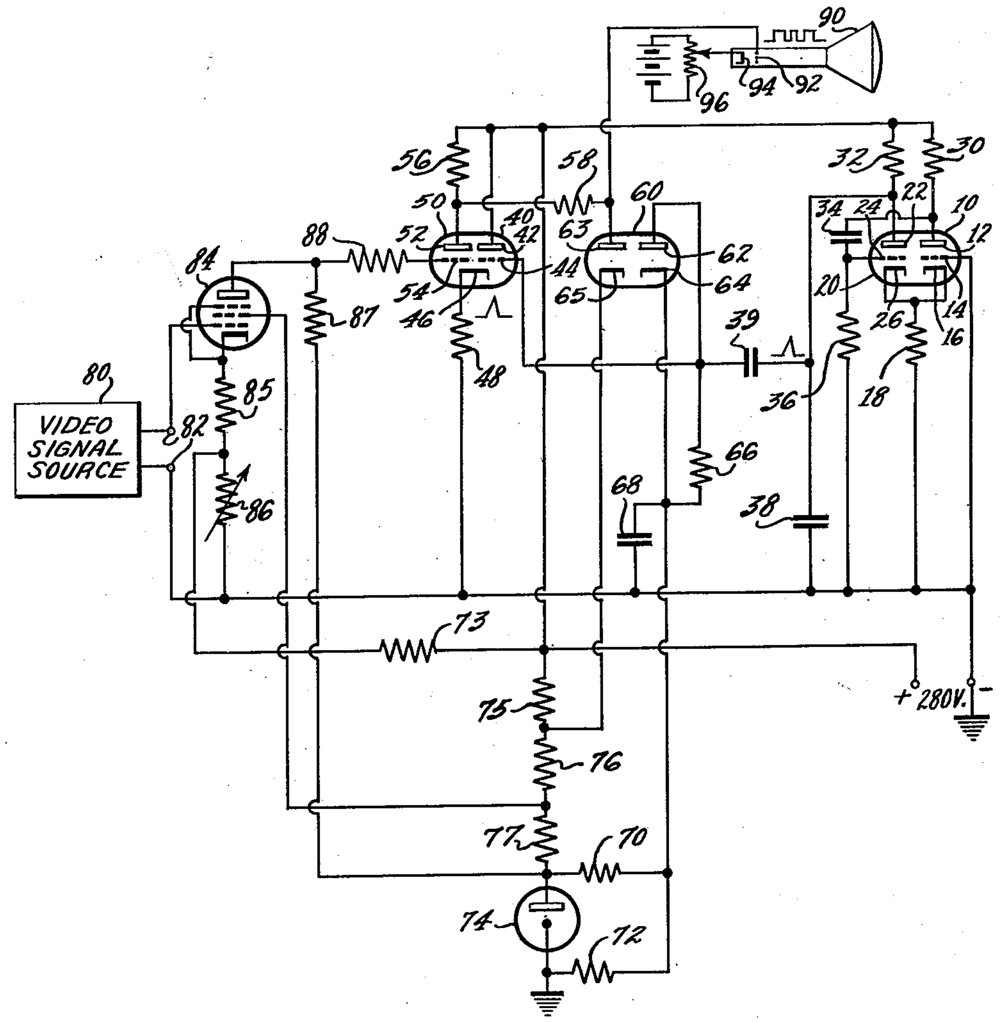
INVENTOR
HAROLD E. HAYNES
BY Morris A. Rabkin
ATTORNEY Patented Mar. 9, 1954 2,671,871

UNITED STATES PATENT OFFICE 2,671,871

SIGNAL TRANSLATING APPARATUS CORRECTION SYSTEM

Harold E. Haynes, Haddonfield, N. J., assignor to Radio Corporation of America, a corporation of Delaware Application July 31, 1951, Serial No. 239,560

5 Claims. (Cl. 315—30)

This invention relates to systems for producing color-corrected separation negatives and more particularly to a circuit for correcting the transfer characteristic of a reproducing kinescope used in such a system.

As is well known, the conventional cathode ray tube or "kinescope" has a strongly curved transfer characteristic, which can be accurately described by an equation of the form $$L=K(e_g-e_{co})^n$$

where L is light output, $e_g$ is control grid potential, $e_{co}$ is the "cut-off" value of grid voltage and $n$ is a constant. The value of $n$ is commonly in the range of 2.5 to 3.5. Thus, when used as an image reproducer in a system which otherwise is approximately linear, the contrast or "overall gamma" is greatly in excess of unity.

In television practice, this situation is usually ignored with acceptable results, although in patents to H. M. Lewis et al., Patent No. 2,269,590, and J. C. Wilson, Patent No. 2,255,692, there are described systems for changing the gamma of television signals by distorting these signals to effectuate a desired correction.

In a system for producing color-corrected separation negatives for color printing, a flying spot scanner is used to scan, at a low rate, a set of positive separation transparencies. The variable light signals are detected by photocells. The electrical output from the photocells is applied to a computer which applies certain corrections to these signals. The computer output consisting of video signals is applied to a kinescope where they are displayed and photographed on film. The requirements of such a system are exacting ones. The system must be a linear one with the only signal alterations being introduced by the computer.

Since the reproducing kinescope has non-linear transfer characteristics, some predistortion must be applied to the video signals to compensate for this. Since the maximum signal frequencies used in this system are low (on the order of 10 kc.) non-linear circuit elements such as thyrites can be used. There are disadvantages to the use of thyrites, because of the difficulty of matching the thyrite curve to the kinescope curve. There is also difficulty in obtaining a match along the complete curve. Furthermore, variations between thyrites makes difficult an interchange of one of the elements of a matched thyrite-kinescope pair.

It is, therefore, an object of the present invention to provide a novel circuit for compensating for the non-linear transfer characteristics of a kinescope used to display video signals.

It is a further object of the present invention to provide an improved circuit for compensating for the non-linear transfer characteristics of a kinescope which permits ready interchange of kinescopes, although their transfer characteristics may differ.

It is still a further object of the present invention to provide a useful and simple circuit for compensating for the non-linear transfer characteristics of a kinescope.

These and further objects of the invention are attained by switching a reproducing kinescope between only two values of beam current, at a rate greater than the picture element rate, and with a duty factor bearing a desired relation to the instantaneous value of the picture signal. This is done by applying a series of substantially rectangular pulses at a nominally constant repetition rate and amplitude, but having a varying duration, to a control electrode of a kinescope in such a way that one of the two values of control electrode voltage is in the cutoff region and the other produces some arbitrary value of beam current. The average beam current (that is, over a period of several pulses) is then proportional to the pulse width or duty cycle, and if the pulse width be controlled in a linear manner by the picture signal, a linear relation of beam current to picture signal will exist. Since the brightness of a phosphor spot is substantially a function of the total number of electrons striking the spot per unit time, whether they arrive in short bursts or continuously, a linear overall characteristic results.

The novel features of the invention, as well as the invention itself, both as to its organization and method of operation, will best be understood from the following description when read in connection with the accompanying drawing, showing a circuit diagram of an embodiment of the invention.

Reference is now made to the circuit diagram of the embodiment of the invention. A sawtooth voltage wave shape generator of the type known as a Potter oscillator circuit is shown. This is described in an article in the "Proceedings of the Institute of Radio Engineers," vol. 26, 1938, p. 713. This circuit consists of a dual triode having a common cathode load resistor 18 for the two cathodes, 16, 26, an anode load resistor 30, 32 connected between each of the respective anodes 12, 22 and B+, and a repetition rate determining condenser connected between the anode 12 of one of the triodes 10 and the grid 24 of the other triode 20. A grid leak resistor 36 connects this grid 24 to ground. The grid 14 of the one tube 10 is connected directly to ground. A condenser 38 is connected between ground and the anode 22 of the other of the two triodes. This condenser 38 is alternately charged through the anode resistor 32 to which it is connected and then discharged through the associated tube 20 at a rate determined by the values of the grid leak resistor 36 and the condenser connected to it at the tube grid 24.

The sawtooth voltage, which is generated, is connected through another condenser 39 to the grid 44 of a first tube 40. A second tube 50 has a common cathode 46 with the first tube and a common cathode load resistor 48 is connected between the cathode 46 and ground. The anode 42 of the first tube 40 is connected directly to B+. Therefore, the first tube acts as a cathode follower for the second tube 50. The sawtooth wave, which is applied to the grid 44 of the first tube, has its peak positive level set by the right hand diode of a dual diode tube 60. This right hand diode has a load resistor 66 connected across it and has its anode 62 connected to the first tube grid 44 and its cathode 64 connected to ground through a bypass capacitor 68. The diode cathode is also connected to a point between two resistors 70, 72 which are connected in series across a voltage regulator tube 74. Thereby, the peak positive level of the sawtooth wave, which is applied to the grid 44 of the first tube is determined in accordance with the bias voltage set by the two voltage divider resistors 70, 72 across the voltage regulator tube 74. Sawtooth waves are applied by the first tube 40 to the cathode of the second tube. The second tube has an anode load resistor 56 connected between its anode and B+.

Video signals or picture signals obtained from a source of signals, 80, such as the flying spot scanner system previously explained, are applied to a pair of input terminals 82. These terminals are connected to apply signals impressed thereon to a video amplifier tube 84. The output of the video amplifier tube 84 is applied to the grid 54 of the second tube 50. The result of applying video signals to the grid, and sawtooth signals to the cathode of the second tube is that the sawtooth is clipped in such a way that a roughly rectangular wave having a duty cycle bearing a linear relation to the grid voltage of the second tube appears at its plate, provided that the second tube has a relatively high transconductance so that it goes from conducting to a nonconducting condition within a few volts of grid potential change.

The clipping action may be explained by the fact that as the triangular wave applied to the cathode of the tube begins to increase in voltage, it operates to cut off the tube. This is opposed by the video signal. The higher the amplitude of the video signal the later the tube cut off by the sawtooth wave occurs, and the sooner the tube becomes conducting again. Since the tube operates to invert the phase of the applied signals, when the tube is cut off, the voltage at the anode goes positive. The duration of these positive pulses is thus determined by the instantaneous amplitude of the video signals. Essentially the sawtooth wave peaks are clipped at an amplitude dependent upon the instantaneous amplitude of the video signals and a substantially rectangular wave is generated having a width determined by the width of the clipped sawtooth peak.

The left half of the dual diode 60 has its anode 63 connected through a resistor 58 to the anode 52 of the second triode, as well as to the brightening control grid 92 of a kinescope 90. The cathode 65 of the left half of the dual diode 60 is connected to a voltage tap-down point on a bleeder resistor 75, 76, 77, which is connected between the B+ source and the voltage regulator tube 74. The left half of the dual diode 60 thus serves to clamp the upper level of the output of the second tube 50, so that the amplitude of the output voltage of the second tube does not exceed the value determined by the voltage point to which the dual diode cathode 65 is connected. This diode thus serves to improve the squareness of the positive part of the output pulses by not using the near-cutoff region of the clipper tube characteristics. The cathode 94 of the kinescope 92 is connected to a bias source 96 which normally maintains the cathode ray beam of the tube cut off. The substantially rectangular pulses which are applied to the control grid 92 of the kinescope 94 serve to key the cathode ray beam on for the duration of each pulse. Accordingly, since the positive or "on" level of the signal applied to the kinescope grid is fixed and since the beam of the kinescope is maintained at a fixed off position in the absence of signal, the kinescope operates between two values of beam current. In view of the fixed bias applied to the kinescope cathode, negative clipping of the signal applied to the kinescope grid is obtained.

Since the duration of the substantially rectangular waves is linearly related to the video signal voltage applied to the second tube grid, 54, the duty cycle of the cathode ray beam is linearly related to the video signals. Accordingly, the transfer characteristic of the kinescope is properly compensated for by being thus made linear. Since the kinescope operates under only two conditions, i. e., either on or off using the time modulated pulses responsive to the video signals, the substitution of one kinescope for another, even though the tube transfer characteristics differ, does not affect the linearity of operation of this system. A potentiometer control 86 is connected into the cathode circuit of the video amplifier tube 84 for the purpose of affording a bias adjustment so that zero video signal input can be made to coincide with zero duty cycle of the output wave.

By generating some other wave shape than triangular from which to produce pulses for keying purposes, other orbitrary transfer curves may be provided and the invention is not necessarily limited to the linear case.

It is to be understood that the kinescope is equipped with deflection coils and a power supply for providing bias and accelerating voltage in accordance with the standard practice well known to the art. These are not shown here, since they are not deemed necessary to an understanding of the invention.

In the application of the embodiment of the invention shown and described herein to the printing art, a photographic film or plate is placed in front of the kinoscope tube face for the purpose of developing the image thereon. The exact ratio of the pulse rate to picture element rate is unimportant as long as it is sufficiently high to prevent the negative from resolving any dot structure. In an embodiment of the invention which was reduced to practice, the ratio used was about six to one, but this may be made less without ill effect. For the purpose of showing an operating embodiment, but not to be constructed as any limitation on the invention, the following values are provided for the resistors, condensers, and vacuum tubes shown in the circuit diagram:

*Resistors*

| | |
|---|---|
| 18 | 560 |
| 30 | 82K |
| 32 | 82K |
| 36 | 33K |
| 48 | 11K |
| 56 | 15K |
| 58 | 10K |
| 66 | 2.2M |
| 70 | 50K |
| 72 | 100K |
| 73 | 3K |
| 75 | 1.5K |
| 76 | 3K |
| 77 | 2K |
| 85 | 470 |
| 86 | 500 |
| 87 | 15K |
| 88 | 27K |

*Condensers*

| | |
|---|---|
| 34 | 180$\mu\mu$f. |
| 38 | 1800$\mu\mu$f. |
| 39 | .01$\mu$f. |
| 68 | .22$\mu$f. |

*Tubes*

| | |
|---|---|
| 10, 20 | 12AT7 |
| 40, 50 | 6J6 |
| 60 | 6AL5 |
| 74 | OC3/VR-105 |
| 84 | 6AU6 |
| 90 | Kinescope |

There has been shown and described herein a system for compensating for the transfer of characteristics of a kinescope used to reproduce video signals. The system is a novel and simple one and permits substitution of tubes having different transfer characteristics without adverse affect on the operation of the system since it operates between only two values of beam current.

What is claimed is:

1. The combination, with a kinescope of the type used to display video signals, of apparatus for compensating for the non-linear transfer characteristics of said kinescope comprising means to generate uniform sawtooth pulses at a rate sufficiently high to prevent resolution of dot structure on said kinescope, means to modify said pulses and to control the duration of each of said modified pulses in accordance with a predetermined function of said video signals, and means to apply said last named pulses to said kinescope to control duration of intervals in which the cathode ray beam of said kinescope is turned on.

2. The combination, with a kinescope of the type used to display video signals, of apparatus for compensating for the non-linear transfer characteristics of said kinescope comprising means to generate uniform pulses at a rate sufficiently high to prevent resolution of dot structure on said kinescope, means to modify said pulses and to control the duration of each of said modified pulses in accordance with the instantaneous amplitude of each of said video signals, and means to apply said last named pulses to said kinescope to control the duration of intervals in which the cathode ray beam of said kinescope is turned on.

3. The combination, with a kinescope of the type used for displaying video signals, of apparatus for compensating for the non-linear transfer characteristics of said kinescope comprising means for generating sawtooth waves at a frequency which is sufficiently high to prevent resolution of dot structure on said kinescope, means to combine said sawtooth waves and said video signals to derive substantially rectangular waves each having a duration determined by the instantaneous amplitudes of said video signals, means to apply said rectangular waves to said kinescope to key on its cathode raw beam, and means to bias said kinescope to maintain its cathode ray beam off except while one of said substantially rectangular pulses is applied thereto.

4. A system as recited in claim 3 wherein said means to combine said sawtooth waves and said video signals includes a vacuum tube having cathode, anode, and grid electrodes, an anode load resistor connected to said tube anode, a cathode load resistor connected to said tube cathode, means to apply said sawtooth waves to said vacuum tube cathode, means to apply said video signals to said vacuum tube grid, and means to limit the amplitude of the output from said vacuum tube.

5. In combination, with a kinescope of the type having a beam control grid to which video signals are applied, apparatus for compensating for the non-linear transfer characteristics of said kinescope comprising means for generating sawtooth waves at a frequency which is sufficiently high to prevent dot structure resolution, a first and second electron discharge tube each having an anode, cathode and grid electrode, a cathode load resistor connected to both said electron discharge tube cathodes, an anode load resistor connected to the anode of said second electron discharge tube, means to apply said sawtooth signals to the grid of said first tube, means to apply said video signals to the grid of said second tube, means coupled to said second tube anode to limit the output of said second tube to a predetermined maximum amplitude, means to apply the output from said second tube to said kinescope grid to key on the cathode ray beam of said kinescope responsive thereto, and means to bias off said kinescope cathode ray beam in the absence of an ouput from said second tube.

HAROLD E. HAYNES.

References Cited in the file of this patent

UNITED STATES PATENTS

| Number | Name | Date |
|---|---|---|
| 2,189,916 | Messner | Feb. 13, 1940 |
| 2,253,312 | Wilson | Aug. 19, 1941 |
| 2,343,988 | Mahoney, Jr. | Mar. 14, 1944 |
| 2,363,810 | Schrader et al. | Nov. 28, 1944 |
| 2,414,228 | Gottier | Jan. 14, 1947 |
| 2,466,711 | Kenyon | Apr. 12, 1949 |
| 2,569,240 | King et al. | Sept. 25, 1951 |
| 2,602,909 | Reiches | July 8, 1952 |